(12) United States Patent
Han

(10) Patent No.: US 8,540,306 B2
(45) Date of Patent: Sep. 24, 2013

(54) DOOR IMPACT BEAM UNIT FOR 2-DOOR VEHICLE

(75) Inventor: Yongha Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/549,229

(22) Filed: Jul. 13, 2012

(65) Prior Publication Data

US 2013/0147229 A1    Jun. 13, 2013

(30) Foreign Application Priority Data

Dec. 7, 2011    (KR) .................. 10-2011-0130161

(51) Int. Cl.
*B60J 5/04*    (2006.01)

(52) U.S. Cl.
USPC ................... 296/187.12; 296/146.6; 49/502

(58) Field of Classification Search
USPC ............ 296/187.03, 187.12, 203.03, 193.06, 296/146.6; 248/68.1; 49/502
See application file for complete search history.

(56) References Cited

U.S. PATENT DOCUMENTS

| | | | | |
|---|---|---|---|---|
| 5,379,553 A * | 1/1995 | Kimura et al. | ................. | 49/502 |
| 5,755,484 A * | 5/1998 | Chou et al. | ................. | 296/146.6 |
| 6,082,811 A * | 7/2000 | Yoshida | ................. | 296/187.03 |
| 6,302,473 B1 * | 10/2001 | Weber | ................. | 296/146.6 |
| 6,382,707 B1 * | 5/2002 | Dunneback | ................. | 296/146.6 |
| 6,976,728 B2 * | 12/2005 | Froeschle et al. | ................. | 296/146.6 |
| 7,325,862 B2 * | 2/2008 | Rieder et al. | ................. | 296/187.12 |
| 7,503,620 B2 * | 3/2009 | Brennecke et al. | ................. | 296/187.02 |
| 8,303,022 B2 * | 11/2012 | Rouhana et al. | ................. | 296/146.6 |
| 8,371,639 B2 * | 2/2013 | Danaj et al. | ................. | 296/146.6 |
| 2009/0218851 A1 * | 9/2009 | Anderson et al. | ................. | 296/187.03 |
| 2012/0013144 A1 * | 1/2012 | Rouhana et al. | ................. | 296/146.4 |

FOREIGN PATENT DOCUMENTS

| | | |
|---|---|---|
| JP | 2009-227064 A | 10/2009 |
| KR | 1997-0030010 | 7/1997 |
| KR | 1998-046920 A | 9/1998 |
| KR | 10-0194710 B1 | 6/1999 |
| KR | 10-0891089 B1 | 3/2009 |
| KR | 1020120129331 A | 11/2012 |

\* cited by examiner

*Primary Examiner* — Glenn Dayoan
*Assistant Examiner* — Pinel Romain
(74) *Attorney, Agent, or Firm* — Morgan, Lewis & Bockius LLP

(57) ABSTRACT

Wide brackets of door impact beams are formed in a Z shape such that beam contact parts are extended horizontally in one direction above oblique force support parts and wide overlap parts are extended horizontally in the opposite direction below the oblique force support parts. Therefore, while an overlap section of a door with respect to a B pillar is further widened, a body frame and a B pillar of a 2-door coupe vehicle exhibit the same safety performance as a body frame and a B pillar of a 4-door sedan vehicle.

7 Claims, 7 Drawing Sheets

CROSS-SECTION Sb-Sb

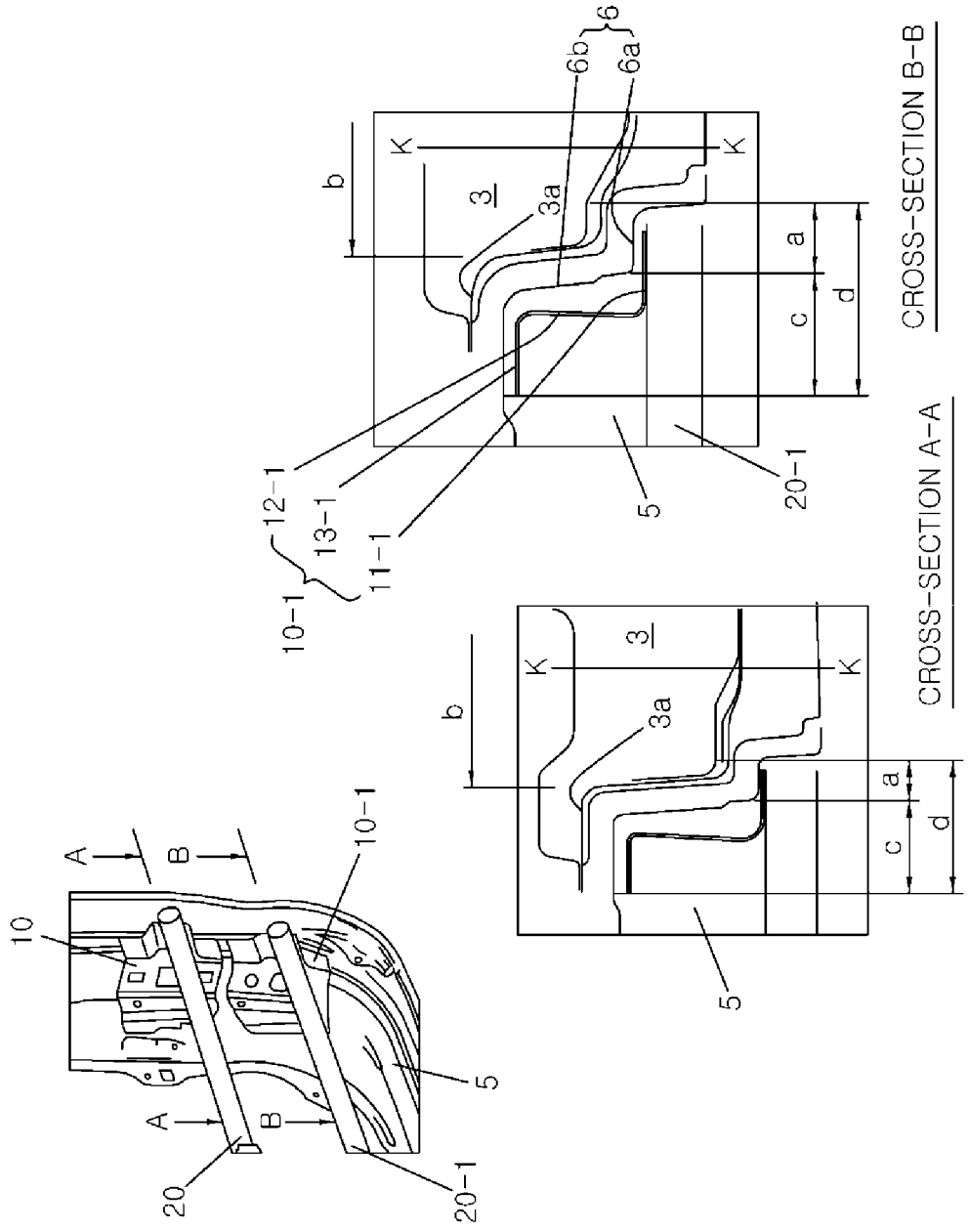

DOOR IMPACT BEAM UNIT FOR 2-DOOR VEHICLE

CROSS-REFERENCE TO RELATED APPLICATIONS

The present application claims priority of Korean Patent Application Number 10-2011-0130161 filed Dec. 7, 2011, the entire contents of which application is incorporated herein for all purposes by this reference.

BACKGROUND OF INVENTION

1. Field of Invention

The present invention relates to a door impact beam for a vehicle, and more particularly, to a door impact beam unit which is capable of significantly improving stability against door intrusion even in a 2-door vehicle by enhancing the stiffness of a door inner panel overlapping a B-pillar portion of a body frame and increasing an intrusion stopping force.

2. Description of Related Art

In general, a door includes a door impact beam provided to suppress a door from being intruded by a side impact.

The door impact beam is arranged across a door width in an internal space formed by a door outer panel and a door inner panel, and a mounting bracket welded and fixed to the panels is applied to both end portions of the door impact beam, thereby maintaining a fixed state.

The internal space is referred to as a safe space, because the internal space absorbs and reduces the deformation of the panels.

Typically, a door having a door impact beam installed therein has no difference in structure between a 4-door sedan vehicle and a 2-door coupe vehicle, but a body frame for providing an opening/closing support structure of the door has a large difference in structure between a 4-door sedan vehicle and a 2-door coupe vehicle.

FIG. 5A illustrates a body frame 100 applied to a 4-door sedan vehicle. Referring to FIG. 5A, body frame 100 includes an A pillar 101 which is closely attached to one side edge of a door 300 and forms a hinge coupling structure of the door and a B pillar 102 which is coupled to a door edge when door 300 is opened/closed.

An intrusion side portion 301 forming one side end of door 300 has an overlap section W which overlaps B pillar 102, and overlap section W overlaps the B pillar so as to cross the center line K-K of a B-pillar width B (overlap section A). Accordingly, intrusion side portion 301 may be more stably supported by B pillar 102.

FIG. 5B illustrates a body frame 200 applied to a 2-door coupe vehicle. Referring to FIG. 5B, body frame 200 includes an A pillar 201 which is closely attached to one side edge of door 300 and forms a hinge coupling structure of the door and a B pillar 202 which is coupled to a door edge when door 300 is opened/closed.

An intrusion side portion 302 forming one side end of door 300 has an overlap section W which overlaps B pillar 202, but overlap section W overlaps the B pillar so as not to cross the center line K-K of a B-pillar width B (overlap section a).

Typically, a door includes a door impact beam installed therein, regardless of whether the door is applied a 2-door coupe vehicle or 4-door sedan vehicle. Such a door impact beam relieves an impact and stops door intrusion, thereby more stably protecting passengers from the door intrusion regardless of vehicle types.

However, since overlap section a of the 2-door coupe vehicle is smaller than overlap section A of the 4-door sedan vehicle, the 2-door coupe vehicle is relatively vulnerable to door intrusion.

In particular, because of such a fundamental structural limit, an impact absorption operation through the door impact beam may not be satisfactorily performed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a door impact beam unit for a 2-door vehicle, which is capable of significantly enhancing an intrusion stopping force of a B pillar without design changes for a door, a body frame, and a door impact beam, by further expanding an overlap section of the body frame with respect to the B pillar using wide brackets supporting the door impact beam inside the door.

Various aspects of the present invention provide for a door impact beam unit for a 2-door vehicle, including a wide bracket. The wide bracket includes a beam contact part having an end portion which connects a door outer panel and a door inner panel and at which an end portion of a door impact beam is positioned, inside the door outer panel, and having such an overlap length as to partially surround the end portion of the door impact beam, a wide overlap part maintaining a horizontal state in the opposite direction of the beam contact part, overlapping the inside of the door inner panel overlapping a B pillar of a body frame, and having such an overlap length as to overlap the door inner panel, and a force support part integrally connecting the beam contact part and the wide overlap part and inclined in such a manner that the overlap section of the wide overlap part is positioned at the end portion of the door inner panel.

The wide overlap part of the wide bracket may be added to overlap the end portion of the door inner panel positioned at a side extended portion of the B pillar.

The force support part of the wide bracket may have one or more through-holes formed therein.

The wide bracket may include a first wide bracket supporting a first door impact beam installed inside the door, and a second wide bracket supporting a second door impact beam spaced at a predetermined distance from the first door impact beam and installed inside the door. Both of the first and second wide brackets may have the through-holes formed therein.

According to various aspects of the present invention, as the overlap section of the body frame with respect to the B pillar is significantly expanded only by changing the bracket structure supporting the door impact beam inside the door, the stability of the B pillar structure of the 2-door vehicle may be significantly improved by the enhanced door intrusion stopping force.

Further, as the stability enhancement of the B pillar structure of the 2-door vehicle is implemented only by the wide brackets, the design of the door, the body frame, and the door impact beam does not need to be changed.

In addition, as the structure of the wide bracket is simplified, the weight of the door may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 3(a)-(c) are a cross-sectionals view of an exemplary door impact beam unit for a 2-door coupe vehicle according to the present invention.

Figure 1A:
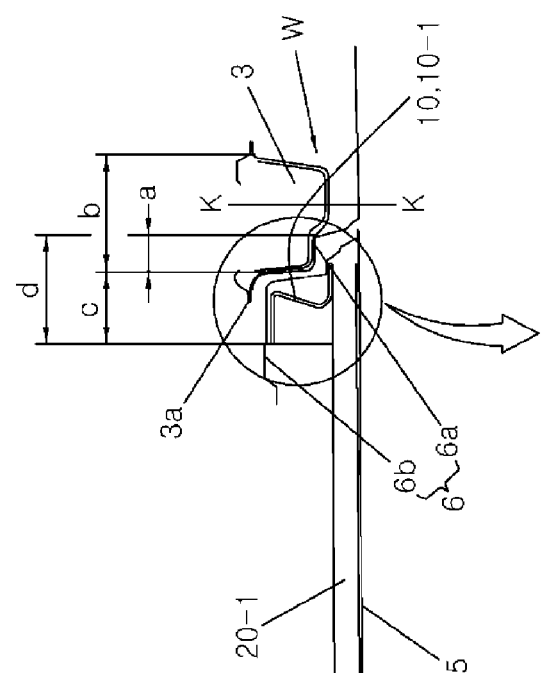
FIGS. 1(a)-(d) are construction diagrams of an exemplary door impact beam unit for a 2-door coupe vehicle according to the present invention.
Figure 1B:
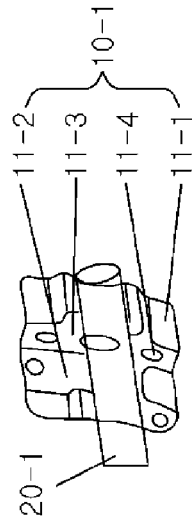
Figure 1C:
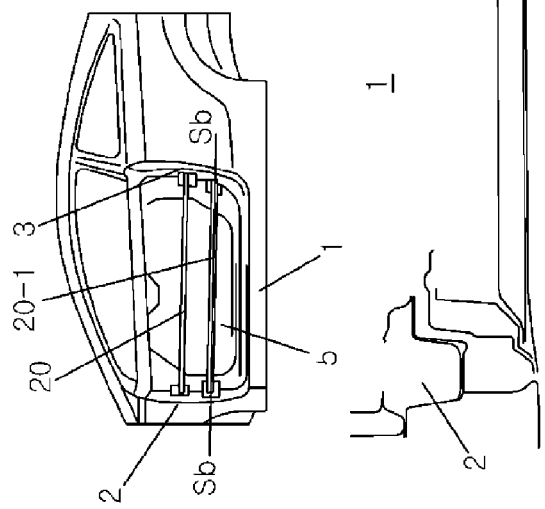
Figure 1D:
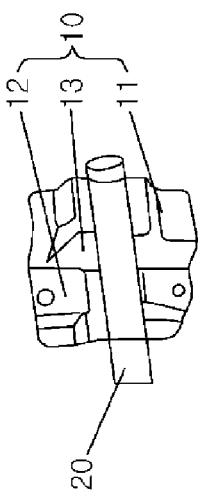

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a door impact beam unit includes a pair of door impact beams 20 and 20-1 positioned at an intrusion side portion 6 of a door 5 having an overlap section W with a B pillar 3 of a body frame 1 and a pair of wide brackets 10 and 10-1 to obliquely bisect an empty space formed by intrusion side portion 6 of door 5.

Body frame 1 includes an A pillar 2 which is closely attached to one side edge of door 5 and forms a hinge coupling structure of the door and B pillar 3 which is coupled to a door edge when door 5 is closed/opened. This structure may be applied to a 2-door coupe vehicle.

Intrusion side portion 6 of door 5 forms an overlap section a which overlaps the width b of B pillar 3 of body frame 1, in order to stop intrusion of door 5.

Therefore, intrusion side portion 6 has an empty space formed by a door outer panel and a door inner panel of door 5, and is where door impact beams 20 and 20-1 and wide brackets 10 and 10-1 supporting door impact beams 20 and 20-1 are positioned.

Overlap section a which intrusion side portion 6 of door 5 forms with respect to B pillar 3 does not cross the center line K-K of B pillar 3. Accordingly, the structure of intrusion side portion 6 may be applied to a 2-door coupe vehicle.

However, intrusion side portion 6 of door 5 applied to a 2-door coupe vehicle according to various embodiments of the present invention basically forms overlap section a of B pillar 3, and additionally forms an extended overlap section c using an extended portion of B pillar 3. Extended overlap section c deviates from the width b of B pillar 3.

Extended overlap section c is where a stepped side overlap part 6b which is integrally connected to an opposed overlap part 6a of a door inner panel forming intrusion side portion 6 of door 5 is positioned at a B-pillar side extended part 3a of B pillar 3, and wide brackets 10 and 10-1 are set to overlap side overlap part 6b, thereby increasing the stiffness of side overlap part 6b.

Accordingly, an overlap section d of intrusion side portion 6 of door 5 may further include extended overlap section c using the extended portion of B pillar 3 in addition to overlap section a using the width b of B pillar 3.

As the stiffness is enhanced by the above-described structure, even door 5 applied to a body frame and a B pillar of a 2-door coupe vehicle may exhibit the same intrusion stopping force as a door applied to a body frame and a B pillar structure of a 4-door sedan vehicle.

For this structure, the wide brackets according to various embodiments of the present invention include first and second wide brackets 10 and 10-1 having the same basic structure. However, the detailed structures and shapes of first and second wide brackets 10 and 10-1 may be formed in different manners by adding some components to first and second wide brackets 10 and 10-1.

However, first door impact beam 20 welded and fixed by using first wide bracket 10 and second door impact beam 20-1 welded and fixed by using second wide bracket 10-1 have the same structure and shape.

Figure 2A:
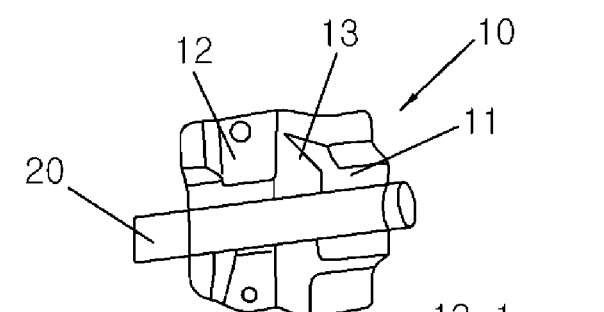
FIGS. 2A(a)-(b) and FIG. 2B are a detailed construction diagram of an exemplary door impact beam unit for a 2-door coupe vehicle according to the present invention.
Figure 2A:
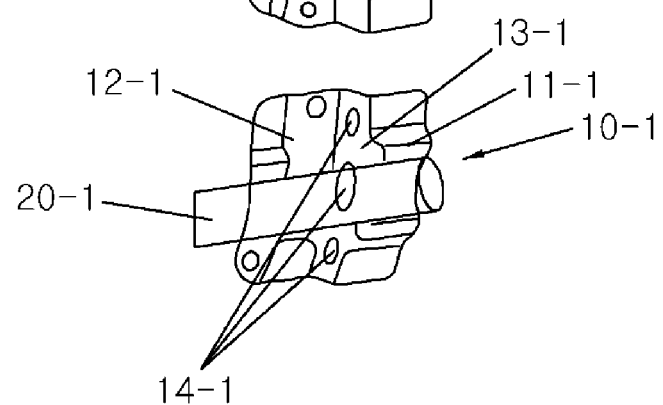

Referring to FIG. 2A, first wide bracket 10 includes a beam contact part 11 having such an overlap length as to partially surround an end portion of first door impact beam 20, a wide overlap part 12 having such an overlap length as to overlap the door inner panel at intrusion side portion 6 of door 5, and a force support part 13 forming an oblique connection portion which integrally connects beam contact part 11 and wide overlap part 12. One will appreciate that the force support part, the beam contact part and the wide overlap part may be monolithically formed.

Second wide bracket 10-1 includes a beam contact part 11-1 having such an overlap length as to partially surround an end portion of second door impact beam 20-1, a wide overlap part 12-1 having such an overlap length as to overlap the door inner panel at intrusion side portion 6 of door 5, and a force support part 13-1 forming an oblique connection portion which integrally connects beam contact part 11-1 and wide overlap part 12-1. One will again appreciate that the force support part, the beam contact part and the wide overlap part may be monolithically formed.

First and second wide brackets 10 and 10-1 may include one or more through-holes 14 formed through force support parts 13 and 13-1 thereof, respectively.

Specifically, through-holes 14 may be formed in force support part 13 of first wide bracket 10 as well as force support part 13-1 of second wide bracket 10-1. Desirably, three through-holes 14 may be formed at even intervals, and the size of through-holes 14 may be decided in consideration of the design stiffness of wide brackets 10 and 10-1.

In various embodiments of the present invention, the formation of through-holes 14 may be differently applied depending on cases.

For example, when there is no fear about damage of B pillar 3 because intrusion side portion 6 of door 5 has a sufficient overlap section d, through-holes 14 may not be formed in first and second wide brackets 10 and 10-1. However, when there is a fear about damage of B pillar 3 because intrusion side portion 6 of door 5 has an insufficient overlap section d, through-holes 14 may be formed in any one of first and second wide brackets 10 and 10-1.

Therefore, when there is a fear about damage of B pillar 3 because of insufficient overlap section d, through-holes 14 may be formed in both of first and second wide brackets 10 and 10-1.

Figure 2B:
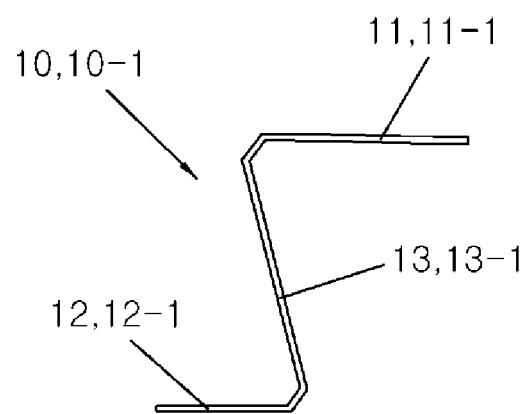

Referring to FIG. 2B, it can be seen that first and second wide brackets 10 and 10-1 have the same cross-sectional structure.

That is, the cross-sectional structure of first and second wide brackets 10 and 10-1 is formed in a Z shape such that beam contact parts 11 and 11-1 are extended horizontally in one direction above oblique force support parts 13 and 13-1 and wide overlap parts 12 and 12-1 are extended horizontally in the opposite direction below oblique force support parts 13 and 13-1.

Meanwhile, referring to FIG. 3, door 5 includes a first door impact beam 20 and a second door impact beam 20-1, and second door impact beam 20-1 is positioned downward at a predetermined distance from first door impact beam 20. At intrusion side portion 6 of door 5 positioned at B pillar 3, first door impact beam 20 is welded and supported by first wide bracket 10, and second door impact beam 20-1 is welded and supported by second wide bracket 10-1.

In such an assembly structure, a cross-section A-A indicates the coupling cross-section of first wide bracket 10.

As illustrated in FIG. 3, first wide bracket 10 is welded and fixed while an end portion of first door impact beam 20 is partially surrounded by beam contact part 11, and welded and fixed to stepped side overlap part 6b of the door inner panel through wide overlap part 12 connected to force support part 13 forming the oblique connection portion from beam contact part 11.

As first wide bracket 10 forming a Z shape is positioned in such a manner, an empty space of intrusion side portion 6 of door 5 is obliquely bisected, but stepped side overlap part 6b of the door inner panel positioned at a B-pillar side extended part 3a of B pillar 3 may have an enhanced stiffness through wide overlap part 12 of first wide bracket 10.

A cross-section B-B indicates the coupling cross-section of second wide bracket 10-1.

As illustrated in FIG. 3, second wide bracket 10-1 is welded and fixed while an end portion of second door impact beam 20-1 is partially surrounded by beam contact part 11-1, and welded and fixed to stepped side overlap part 6b of the door inner panel using wide overlap part 12-1 connected to force support part 13-1 forming the oblique connection portion from beam contact part 11-1.

As second wide bracket 10-1 forming a Z shape is positioned in such a manner, an empty space of intrusion side portion 6 of door 5 is obliquely bisected, but stepped side overlap part 6b of the door inner panel positioned at B-pillar side extended part 3a of B pillar 3 may have an enhanced stiffness through wide overlap part 12-1 of second wide bracket 10-1.

Figure 4:
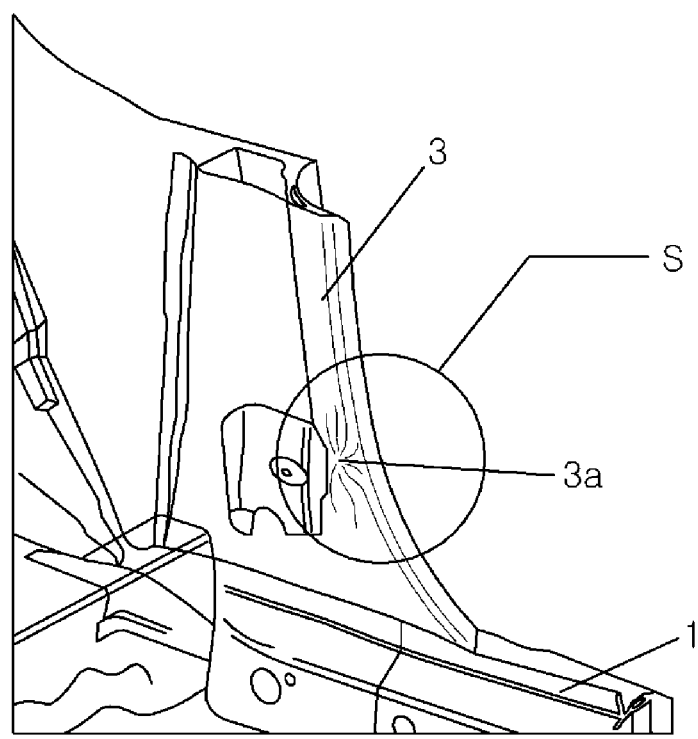
FIG. 4 is a diagram illustrating that an impact is absorbed by an exemplary door impact beam unit for a 2-door coupe vehicle according to the present invention.
Figure 5A:
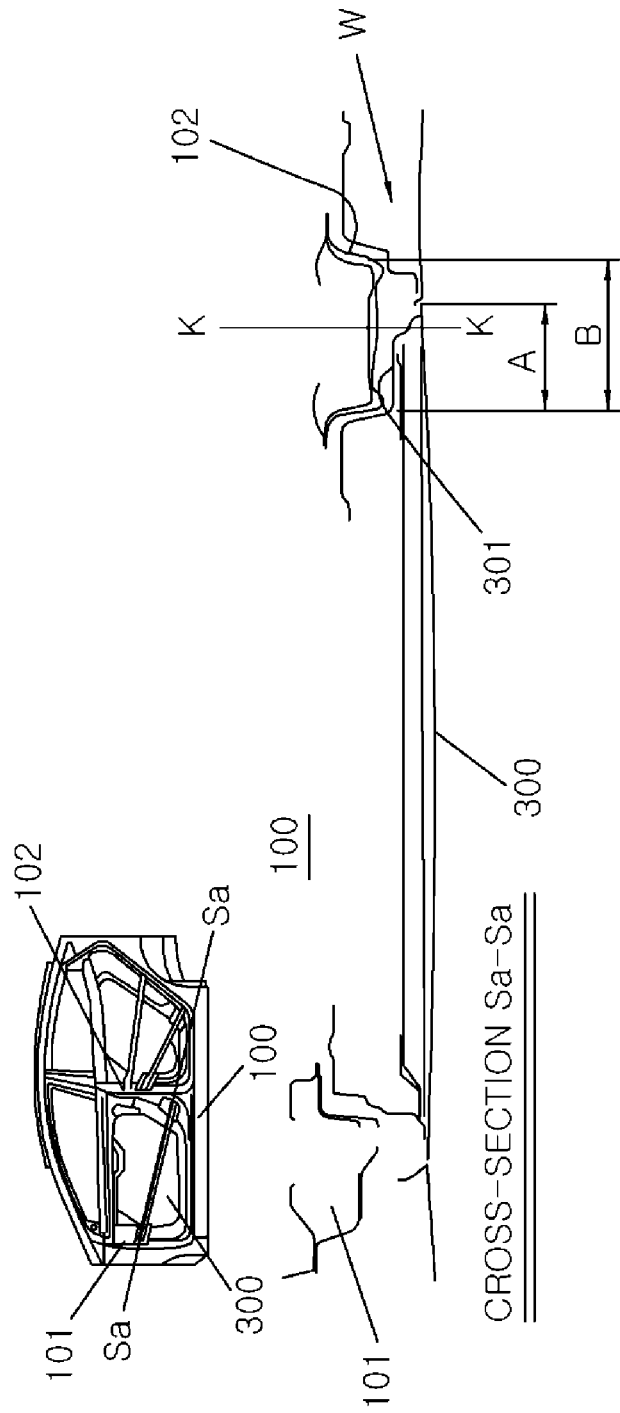
FIGS. 5A and 5B are cross-sectional views of exemplary body frames of a 4-door sedan vehicle and a 2-door coupe vehicle, respectively, according to the related art.
Figure 5B:
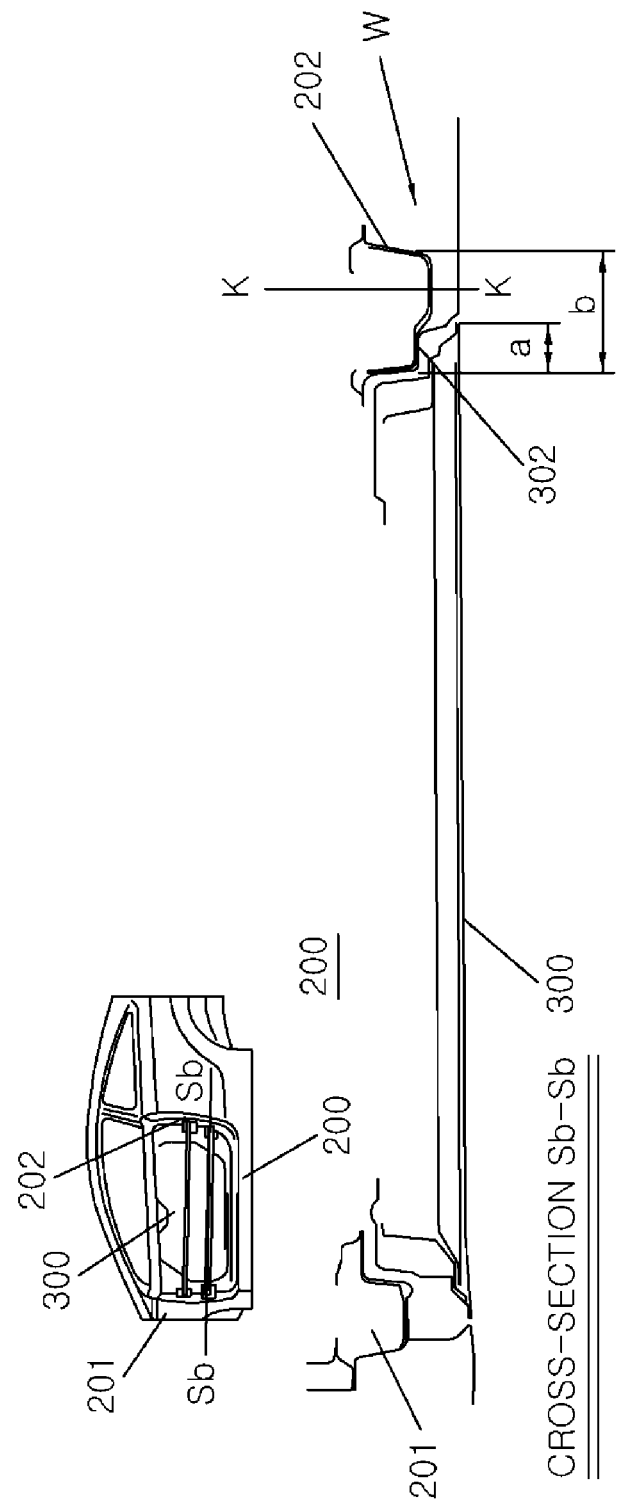

Referring to FIG. 4, it can be seen that stiffness against an impact is improved through the door impact beam unit in a 2-door coupe vehicle whose stiffness is strengthened by first and second wide brackets 10 and 10-1 and which has a widened overlap section.

As illustrated in FIG. 4, it is experimentally proved that, although an impact is applied, damage S of B pillar 3 in the 2-door coupe vehicle is not serious.

This is because the stiffness of side overlap part 6b of door 5 using the Z shape of first and second wide brackets 10 and 10-1 is enhanced. The stiffness enhancement through side overlap part 6b is implemented by overlap section d of intrusion side portion 6 of door 5, which includes basic overlap section a using width b of B pillar 3 and extended overlap section c using side extended part 3a of B pillar 3.

Accordingly, although the body frame and the B pillar structure of a 2-door coupe vehicle are applied, door 5 may exhibit the same intrusion stopping force as the body frame and the B pillar structure of a 4-door sedan vehicle.

Experimentally, it has been proved that a maximum plastic strain ratio of 3.5% or less, at which the door is not likely to be ruptured, is exhibited without structural change of B pillar 3 applied to body frame 1 of the 2-door coupe vehicle.

As described above, wide brackets 10 and 10-1 of door impact beams 20 and 20-1 according to various embodiments of the present invention are formed in a Z shape such that beam contact parts 11 and 11-1 are extended horizontally in one direction above oblique force support parts 13 and 13-1 and wide overlap parts 12 and 12-1 are extended horizontally in the opposite direction below oblique force support parts 13 and 13-1. Therefore, while overlap section d of door 5 with respect to the B pillar 3 is further widened, the body frame and the B pillar of the 2-door coupe vehicle may exhibit the same safety performance as the body frame and the B pillar of the 4-door sedan vehicle.

For convenience in explanation and accurate definition in the appended claims, the terms upper or inside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door impact beam unit for a 2-door vehicle, comprising:
    a beam contact part including an end portion connecting a door outer panel and a door inner panel and at which an end portion of a door impact beam is positioned, inside the door outer panel, and having such an overlap length as to partially surround the end portion of the door impact beam;
    a wide overlap part maintaining a horizontal state in the opposite direction of the beam contact part, overlapping a stepped side overlap part of the door inner panel positioned at a B-pillar side extended part of a B pillar of a body frame, and having such an overlap length as to overlap the door inner panel; and a force support part integrally and continuously connecting the beam contact part and the wide overlap part and inclined to form a Z shape therebetween in such a manner that an overlap section of the wide overlap part is positioned at an end portion of the door inner panel.

2. The door impact beam unit as defined in claim 1, wherein the wide overlap part is added to overlap the end portion of the door inner panel positioned at a side extended portion of the B pillar.

3. The door impact beam unit as defined in claim 1, wherein the force support part includes one or more through-holes formed therein.

4. The door impact beam unit as defined in claim 3, wherein three though-holes are formed at even intervals.

5. The door impact beam unit as defined in claim 1, further comprising:
   a first wide bracket supporting a first door impact beam installed inside the door; and
   a second wide bracket supporting a second door impact beam spaced at a predetermined distance from the first door impact beam and installed inside the door.

6. The door impact beam unit as defined in claim 5, wherein both of the first and second wide brackets include the through-holes formed therein.

7. The door impact beam unit as defined in claim 5, wherein the first or second wide bracket has the through-holes formed therein.

* * * * *